Aug. 2, 1966 W. D. PRICER 3,264,495

MEMORY SIGNAL DETECTOR UTILIZING NEGATIVE RESISTANCE DIODED AND AN OPEN TRANSMISSION LINE

Filed Dec. 31, 1963

INVENTOR
WILBUR D. PRICER

BY

ATTORNEY 3,264,495
Patented August 2, 1966

3,264,495

MEMORY SIGNAL DETECTOR UTILIZING NEGATIVE RESISTANCE DIODED AND AN OPEN TRANSMISSION LINE

Wilbur D. Pricer, Pleasant Valley, N.Y., assignor to International Business Machines Corporation, New York, N.Y., a corporation of New York Filed Dec. 31, 1963, Ser. No. 334,799
10 Claims. (Cl. 307—88.5)

This invention relates to signal detectors and more particularly to an improved thin film memory data signal detector.

The advent of thin film memories has placed increasingly difficult performance demands upon data signal detectors and amplifiers. For instance, in conventional magnetic core memories, output signal levels of the order of 30 mv. can be expected; whereas corresponding flat film memory output levels may be from 1 to 2 mv. Additionally, while there has been a noise problem in magnetic core memories, it has not been of the magnitude now present in film memories, where instead of the noise being within an order of magnitude of the data signals, disturbances from 50 to 100 times the amplitude of expected output data signals are experienced. A further problem is encountered when it is realized that the desirability of flat film memories lies mainly in their extremely fast speeds, e.g., 100–200 nanosecond cycle times versus 2–20 microsecond cycle times for magnetic core memories. The problem is thus that a data signal detector must not only be able to discriminate between the high level noise disturbances and data signals, but also be able to perform this function and recover in extremely short periods of time to be ready for the next data signal.

Conventional memory sense amplifiers have proven insufficient to cope with the above situation. The well-known and widely used D.C. amplifier-detector meets the recovery time requirements as regards speed of response, but the normally experienced drift in such amplifiers is of a greater magnitude than the data signals. A.C. coupled amplifier-detectors are more stable than D.C. amplifiers, but do not meet the recovery time requirements, in that the RC coupling circuits have time constants equal to or greater than the allowable memory cycle times.

Accordingly, it is an object of this invention to provide a memory signal detector adapted to sense signal outputs from thin film memories.

It is another object of this invention to provide a memory signal detector having a recovery time which is compatible with the cycle time requirements of thin film memories.

It is still another object of this invention to provide a memory signal detector which has extremely fast recoveries from high level noise disturbances.

A further object of this invention is to provide a data signal detector capable of detecting a low level data signal in the presence of background noise.

A still further object of this invention is to provide a data signal detector capable of producing an output indicative of the polarity of a first portion of data signal and ignoring all other signals or portions thereof.

In accordance with the above-stated objects, a pair of negative resistance devices exhibiting bistable positive resistance states are connected to an input terminal by a transmission line which is substantially shorter than any expected disturbance signal. The negative resistance devices are forward biased in opposite manners during the read cycle so as to be responsive to opposite polarity input signals. Resistive impedances connect opposite terminals of the negative resistance devices to one another. One or the other of the negative resistance devices is caused to switch to its high resistance state in response to the first portion of an input data signal, causing a feedback signal through the resistive impedances which renders the opposite negative resistance device insensitive to succeeding signals.

During the write cycle, the negative resistance devices are heavily reverse-biased enabling the transmission line to be terminated in its characteristic impedance and thus critically damped. The transmission line therefore radically attenuates any disturbance signal and recovers in an extremely short time due to its critical damping. Additionally, due to the substantially constant low resistance characteristic of the negative resistance devices, any portion of the disturbance signal which is not attenuated and reaches the negative resistance devices causes little or no change in their resistance. The result is a substantially constant impedance across the transmission line allowing it to remain continually critically damped.

The foregoing and other objects, features and advantages of the invention will be apparent from the following more particular description of the preferred embodiments of the invention, as illustrated in the accompanying drawings.

Figures 1, 2, 3, 4, 5:
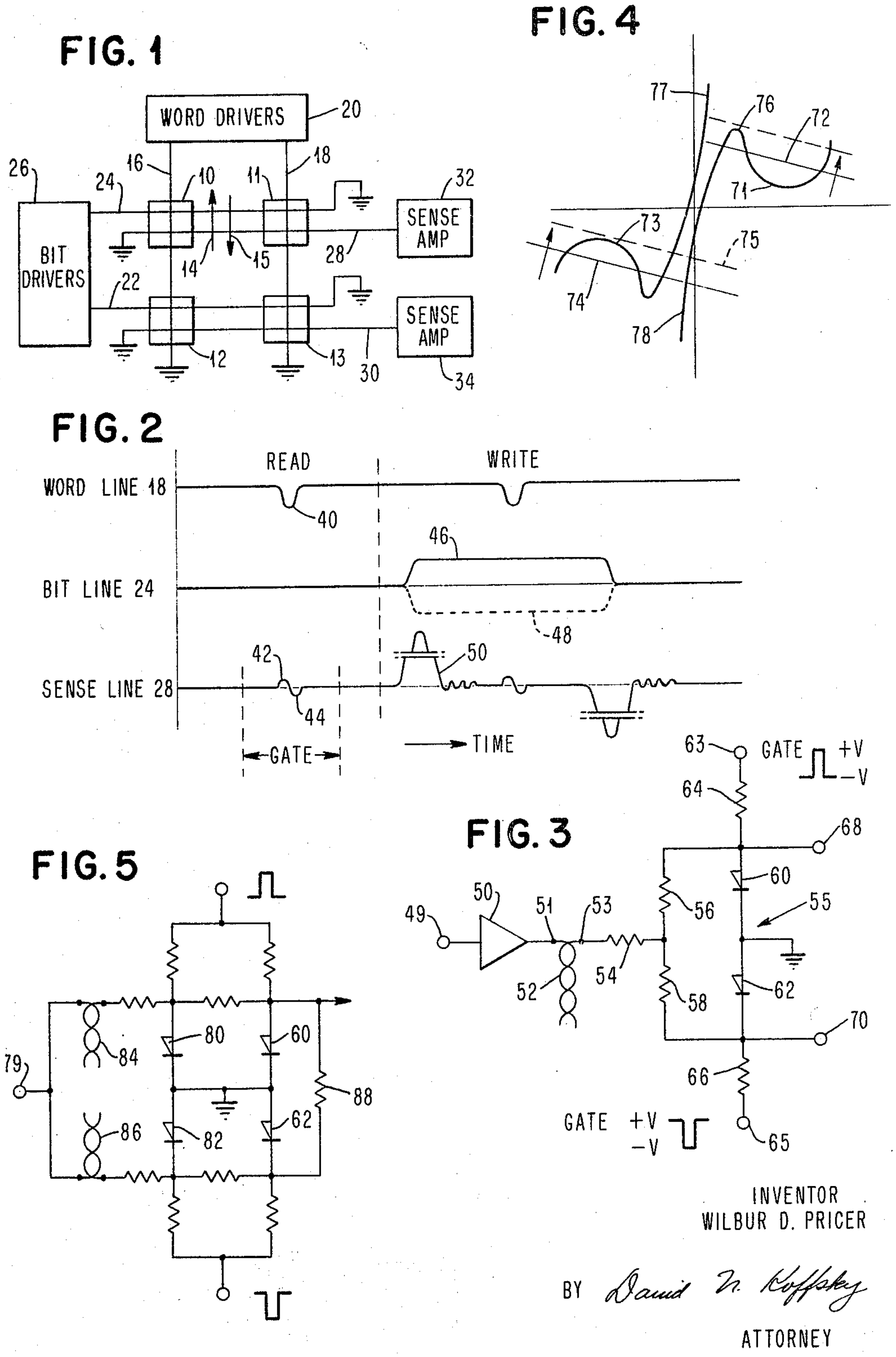
FIG. 1 is a schematic diagram of a representative thin film magnetic memory array.
FIG. 2 is a chart showing the waveform diagrams which occur in the memory array of FIG. 1.
FIG. 3 is a circuit diagram of the invention.
FIG. 4 is a diagram of the characteristics of the negative resistance devices of FIG. 3.
FIG. 5 is an alternative embodiment of the invention as shown in FIG. 3.

In order to facilitate an understanding of the requirements which are placed on thin film memory signal detectors, a short description of an exemplary thin film memory cross section and its associated waveforms will be described. Referring first to FIG. 1, there is shown a 2 by 2 cross section of a thin film ferromagnetic memory array. Bits 10 through 13 are thin nickel-iron films each of which exhibits an anisotropic characteristic, that is, easy directions of orientation (stable) as indicated by arrows 14 and 15 and an orthogonally oriented hard direction of orientation (unstable). Overlaying each of the bits are three conductors which cause the storage and read-out of data. Conductors 16 and 18 are word lines and are selectively energized by word drivers 20. Conductors 22 and 24 are bit lines and are selectively energized by bit drivers 26. Conductors 28 and 30 are sense lines and have induced therein, data signals which result from the change in magnetic flux when one or more of bits 10–13 is read out. Sense lines 28 and 30 feed associated sense amplifiers 32 and 34, respectively.

In describing a representative operation of the memory array, reference will hereinafter be made to FIG. 1 in conjunction with FIG. 2 wherein the electrical waveforms for the operation are shown.

Assume now that bits 11 and 13 comprise the word out of which it is desired to read the stored information and that bit 11 is storing a 1 (with a magnetic orientation as indicated by arrow 14). In order to read out the information from bit 11, word line 18 must be energized to cause the magnetic orientation of bits 11 and 13 to rotate into the hard direction. This is indicated in FIG. 2 by waveform 40. As the magnetic orientation of bit 11 rotates in response to signal impulse 40 on word line 18, the rotating flux lines cut sense line 28 causing a small positive, pulse 42 to be induced thereon. When word line 18 becomes deenergized, bit 11 which is now oriented in the unstable hard direction, falls back to the easy direction. It will be assumed that the magnetization of bit 11 reorients itself so as to cause a negative nal 44 to be induced on sense line 28, but it should be understood that the magnetization could reorient itself to cause a subsequent positive output pulse also. At this point, sense amplifier 32 must be so conditioned as to respond only to pulse 42 and not to pulse 44 since it is evident that it is only the leading portion of the pulse which contains the desired information.

In actual operation, the peak voltage of positive pulse 42 may approximate 1.5 millivolts and have a time duration of 8 nanoseconds. Bits 10 and 12 are unaffected due to the fact that their associated word line 16 is not energized.

Immediately following the read portion of the memory cycle, the write portion is commenced. At this time it is desired either to regenerate the data previously read out or to write in new data, in either case it being necessary to simultaneously energize all bit lines (22 and 24). The energization of bit line 24 is indicated in FIG. 2 by waveform 46, and its polarity is dependent upon the sense of the information to be written into bit 11. Bit drivers 26 are designed to provide a positive energization (waveform 46) or a negative energization (waveform 48) as required. Since each sense line is parallel to its associated bit line, a large disturbance pulse (e.g., waveform 40) is induced into the sense line when the associated bit line is energized. Additionally, due to the close proximity of adjacent bits, the energization of adjacent bit lines results in increased disturbance pulses, the worst case being when all 1's are to be written into any single word. It has been found that 100 millivolt disturbance pulses of close to 40 nanoseconds duration are not uncommon in the operation of a thin film memory.

With an understanding of how the particular wave shapes in thin film memories are generated, the operation of sense amplifier 32 will now be described. Referring to FIG. 3, input terminal 49 receives all signals which are induced on sense line 28 (FIG. 1) and passes them to amplifier 50. Amplifier 50 is a wide band, class A amplifier which is designed to pass and amplify any and all signals occurring on sense line 28 (including disturbances). Prior art sense amplifiers have been designed to saturate at disturbance signal levels to thereby prevent disturbances from entering the signal detection circuitry. Once the sense amplifier saturated, however, the time required for it to recover was in the microsecond region making such amplifiers unusable as thin film memories. Amplifier 50, as aforestated, differs in the sense that it does not impede the disturbances.

The output of amplifier 50 is coupled to data signal detector 55 through open circuited transmission line 52. Transmission line 52 is connected through resistor 54 to a common point between resistors 56 and 58. As will be described in detail hereinafter, transmission line 52 presents little or no impedance to data signals, but a very high impedance to disturb signals. Resistors 56 and 58 are chosen to have substantially equal resistance values and provide data signals of equal strength to detector 55. The other terminals of resistors 56 and 58 are connected respectively to the anode of tunnel diode 60 and the cathode of tunnel diode 62. The cathode of tunnel diode 60 and anode of tunnel diode 62 are both connected to a point of common potential. Bias potentials and gating signals are applied at terminals 63 and 65, through resistors 64 and 66, to the anode of tunnel diode 60 and the cathode of tunnel diode 62, respectively. Output signals can be taken at either terminal 68 or 70.

In FIG. 4, there are shown the V-I characteristics of tunnel diodes 60 and 62. Waveforms 71 and 73 illustrate the characteristics of tunnel diodes 60 and 62, respectively. When gating signals are not applied to terminals 63 and 65, the normal potentials ($+V$ and $-V$ respectively) are such as to reverse bias tunnel diodes 60 and 62 into the regions of extreme low resistance (77 and 78 respectively). When positive and negative gating signals are respectively applied to terminals 63 and 65, load lines 72 and 74 are established just below the peak current levels in the low resistance region for tunnel diodes 60 and 62. The period of gating signal energization is shown in FIG. 2 to encompass the time period during which data signal 42 is expected.

Referring now to the operation of the circuit of FIG. 3, positive and negative gating signals are applied to terminals 63 and 65 during the read cycle causing bistable load lines 72 and 74 (FIG. 4) to establish themselves. The circuit is designed to cause the tunnel diodes to be so biased as to reject any background noise which occurs during the time a data signal is expected. Subsequent to the application of the gating signals, the data signal will appear at terminal 50. Assuming that the data signal is as shown in FIG. 2, positive portion 42 will be amplified in amplifier 50, pass through transmission line 52 with little or not attenuation, resistor 54 and appear at the common connection between resistors 56 and 58. This signal causes potential increase at the anode of tunnel diode 60 and the cathode of tunnel diode 62. The rise in anode potential of tunnel diode 60 causes load line 72 to exceed the positive current peak 76 of characteristic curve 71 with the result that tunnel diode 60 switches to its stable high resistance state. This action causes a further rise in the anode potential of tunnel diode 60 with the result that instead of the current from terminal 63 and resistor 64 traveling down through tunnel diode 60 to ground, it is now diverted through resistors 56 and 58 to resistor 66 and terminal 65. This causes a further rise in potential at the cathode of tunnel diode 62 and a resultant depression of its load line 74 to a point (load line 75) where the succeeding negative going portion of the data signal 44 is insufficient to cause it to switch to its high resistance state. Thus there occurs a "lockout" which prevents any signals which succeed the initial portion of the data signal from subsequently affecting the circuitry. The series resistance of resistors 58 and 60 must be proportioned so as to allow sufficient current diversion to the unswitched tunnel diode to provide the lockout. Generally then series resistance will be greater than the negative resistance of the tunnel diodes but less than ten times the negative resistance.

If the negative-going portion of the data signal were the first received, the circuit action would be just the opposite, that is, tunnel diode 62 would switch to its high resistance state and tunnel diode 60 would be back biased to such an extent that it would be insensitive to the following positive data signal portions.

During the subsequent write portion of the memory cycle, the gating signals are no longer present at terminals 63 and 65 and steady state voltages are applied which heavily reverse bias tunnel diodes 60 and 62 in their low resistance states. It is at this time that bit drivers 26 are turned on and induce the high level disturb signals on the sense lines. As aforestated, in all known prior art memory signal detectors, it has been necessary to wait a matter of hundreds of nanoseconds to institute a new read cycle due to the fact of relatively long sense amplifier recovery times from disturb signals. With the system as shown in FIG. 3, recovery times in the order of 18 nanoseconds have been attained—at least an order of magnitude better than the prior art. This reduction is achieved by the specific combination of transmission line 52 and tunnel diode detector 55, in that the characteristics of the tunnel diodes, when biased in their extreme low resistance regions, allow the impedance across terminals 51 and 53 of transmission line 52 to stay essentially constant in the presence of input signals. This situation further allows the external impedances seen across terminals 51 and 53 (e.g., resistors 54, 56 and 58, and output impedance of amplifier 50) to be carefully matched to the characteristic impedance of transmission line 52, with the result that a critically damped, substantially reflectionless line is provided.

To elaborate, if the output from transmission line 52 were fed directly to the base of a transistor, for instance, (the transistor of necessity either being biased hard off or at such a level as to respond to a data signal) the impedance seen across terminals 51 and 53 would, in the first case, be substantially infinite, thereby resulting in a mismatched and highly reflective line, or in the second case the impedance would be variable (dependent on signal strength and frequency of the disturb signal) so as to render it nearly impossible to assure the desired correspondence between the external impedance and characteristic impedance of transmission line 52.

An additional feature of transmission line 52 is that its length is made much less than the wavelength of the disturb pulse, but long enough to not seriously affect the data signal. The following example will explain the interactions of the above feature of transmission line 52 with detector 55.

Assume that the length of the data and disturb signals are 8 and 40 nanoseconds respectively and the effective length of transmission line 52 is 6 nanoseconds, that is, it takes 6 nanoseconds for a signal to propagate to the end and be reflected back to the input terminals (the actual or one-way length of transmission line 52 being 3 nanoseconds). Since in actual practice the external impedance seen across terminals 51 and 53 can be held to a variation of within 10%, the worst case of external impedance ($Z_e$) being 10% greater than the characteristic impedance ($Z_o$) of transmission line 52 will be assumed. With these figures the reflection coefficient can be calculated from the well known transmission line formula $$k_r = \frac{Z_e - Z_o}{Z_e + Z_o} = \frac{.1}{2.1} \simeq \frac{1}{20}$$

Thus it can be seen that only $\frac{1}{20}$ of the incident signal is reflected by the input terminals after the signal has made one traversal of the transmission line. On the second reflection only $\frac{1}{400}$ of the signal will be reflected and on the third reflection only $\frac{1}{8000}$.

With the above facts in mind, the novel cooperation between transmission line 52 and detector 55 can now be realized. First, transmission line 52 appears as a mere resistance for 6 nanoseconds to the data signal (time for incident waveform to travel to the end of the transmission line and be reflected). Within these 6 nanoseconds, one or the other of tunnel diodes 60 or 62 has already switched and produced the desired output and lockout, so that the fact that the last 2 nanoseconds of the data signal are attenuated by the reflected waveform is of no consequence. Upon receiving the 40 nanosecond disturb pulse, transmission line 52 again resembles a resistance for 6 nanoseconds and allows a small portion of the disturb to enter detector 55, but, due to the fact that tunnel diodes 60 and 62 are reverse biased far into their low resistance regions (in the order of 1 ohm), the signal which gets through is substantially shorted to ground. Additionally, the resistance of the tunnel diodes vary only slightly if at all, in response to the aforementioned signal and have no effect on the impedance as seen across terminals 51 and 53. After the first 6 nanoseconds, the reflected disturb signal subtracts from the remaining 34 nanoseconds of the incident disturb and greatly attenuates it. Attenuations of the disturb signal of 4 and 5 to 1 are achieved through this simple expedient. Additionally, it can be seen that transmission line 52, due to its critical damping—which is not affected by the receipt of a signal—can substantially recover and be ready for the next signal within 18 nanoseconds after the termination of the disturb signal.

Referring now to FIG. 5 there is shown a modification of the basic circuit of FIG. 3 wherein an additional pair of tunnel diodes 80 and 82 have been added to the circuit along with associated input transmission lines 84 and 86. In this circuit tunnel diodes 80 and 82 perform the function of quantizing and detecting the data signal before it is applied to tunnel diodes 60 and 62 which perform the lock-out function. Tunnel diodes 80 and 82 thereby eliminate any problem of data signal level variations which might inadvertently cause the detector to malfunction.

If the positive-going portion of the data signal appears first at terminal 79, it causes tunnel diode 80 to assume its high resistance state with a resultant positive voltage shift of a predetermined amount applied to the anode of tunnel diode 60. In this case, no lock-out occurs due to the fact that transmission line 84 acts as a D.C. isolating element preventing the rise in D.C. potential at the anode of tunnel diode 80 from affecting the cathode of tunnel diode 82. When the quantized positive signal arrives at the anode of tunnel diode 60 it causes it to switch its high resistance state with the signal lock-out path being through resistor 88 to the cathode of tunnel diode 62. If the negative portion of the data signal leads, like occurrences take place with tunnel diodes 82 and 62.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a system wherein low level, short duration signals and high level, long duration disturb signals occur sequentially, a sense amplifier adapted to receive, attenuate and recover from said disturb signals in time to sense a shortly succeeding data signal, the combination comprising:

- input means for providing said signals;
- a data signal detector, said detector including negative resistance means having stable low and high positive resistance regions separated by an unstable negative resistance region, said low positive resistance region exhibiting an extremely low resistance value which remains substantially constant in response to input signal variations falling below a preset level;
- gating means for reverse biasing said negative resistance means when said disturb signal is expected and for forward biasing said negative resistance means to a point in said low resistance region near said negative resistance region when said data signal is expected; and
- a transmission line connected between said data signal detector and said input means, said transmission line having an electrical length substantially less than said disturb signal and being substantially critically damped when said negative resistance means are reverse biased, said transmission line acting to attenuate said disturb signal to a point where it does not exceed said preset level whereby said transmission line remains critically damped even in the presence of a disturb signal.

2. In a system wherein low level, short duration signals and high level, long duration disturb signals occur sequentially, a sense amplifier adapted to receive, attenuate and recover from said disturb signals in time to sense a shortly succeeding data signal, the combination comprising:

- input means for providing said signals;
- a data signal detector, said detector including polarity sensing negative resistance means having stable low and high positive resistance regions separated by an unstable negative resistance region, said low positive resistance region exhibiting an extremely low resistance which remains substantially constant in response to input signal variations falling below a preset level;
- gating means for reverse biasing said negative resistance means when said disturb signal is expected and for forward biasing said negative resistance means to a point in said low resistance region near said negative resistance region when said data signal is expected; and an open circuited transmission line, one terminal of said line connected to said input means and another terminal to said data signal detector, the electrical length of said transmission line being substantially less than said disturb signal, and the external impedance appearing across said terminals being substantially matched to the characteristic impedance of said transmission line when said negative resistance means are reverse biased, said transmission line thereby acting to attenuate said disturb signal to a point where it does not exceed said preset level with the result that the external impedance across said terminals remains constant in the presence of a disturb signal.

3. The invention as defined in claim 2 wherein the lectrical length of said transmission line is long enough to llow a major portion of said data signal to pass before he leading edge of the incident data signal arrives back at aid terminals after being reflected by the open circuited nd.

4. The invention as defined in claim 2 wherein said data ignal detector includes further negative resistance means or quantizing any received signals before they are applied o said polarity sensing negative resistance means.

5. In a system wherein low level, short duration data ignals and high level, long duration disturb signals ocur sequentially, a sense amplifier adapted to receive, atenuate and recover from said disturb signals in time to ense the polarity of a portion of a shortly succeeding data ignal, the combination comprising:

input means for providing said signals;

a data signal polarity detector, said detector including a pair of two terminal negative resistance means having stable low and high positive resistance regions separated by an unstable negative resistance region, said low positive resistance region exhibiting an extremely low resistance which remains substantially constant in response to input signal variations falling below a preset level;

resistive means connecting opposite terminals of said negative resistance means;

gating means for heavily reverse biasing both said negative resistance means when said disturb signal is expected and for forward biasing both said negative resistance means to a point in said low resistance region near said negative resistance region when said data signal is expected, the receipt of a portion of a data signal causing one of said negative resistance means to switch to its high resistance region and to divert sufficient bias current through said resistive means to render the other of said negative resistive means insensitive to other portions of said data signal; and an open circuited transmission line, one terminal of said line connected to said input means and another terminal to said resistive means, the electrical length of said transmission line being substantially shorter than said disturb signal, and the external impedance appearing across said terminals being substantially matched to the characteristic impedance of said transmission line when said negative resistance means are reverse biased, said transmission line thereby acting to attenuate said disturb signal to a point where it does not exceed said preset level with the result that the external impedance across said terminals remains constant in the presence of a disturb signal.

6. In a memory system wherein low level, short duration signals and high level, long duration disturb signals occur sequentially, a sense amplifier adapted to receive, attenuate and recover from said disturb signals in time to sense the polarity of a leading portion of a shortly succeeding data signal, the combination comprising:

input means for providing said signals;

a data signal detector, said detector including first and second negative resistance devices, each having an anode and cathode and each exhibiting stable low and high positive resistance regions separated by an unstable negative resistance region, said low positive resistance region exhibiting an extremely low resistance value which remains substantially constant in response to input signal variations falling below a present level, the cathode and anode of said first and second devices respectively being connected to a common potential;

substantially identical resistive elements connecting the anode and cathode of said first and second devices respectively;

gating means connected to the anode and cathode of said first and second devices for reverse biasing both said negative resistance devices when said disturb signal is expected and for forward biasing both said negative resistance devices to a point in said low resistance region near said negative resistance region when said data signal is expected, the receipt of a leading portion of a data signal causing one of said devices to switch to its high resistance region and to divert sufficient bias current through said resistive elements to render the other of said devices insensitive to subsequent portions of said data signal; and an open circuited transmission line, one terminal of said line connected to said input means and another terminal to said resistive elements, the electrical length of said transmission line being substantially shorter than said disturb signal, and the external impedance across said terminals being substantially matched to the characteristic impedance of said transmission line when said negative resistance devices are reverse biased, said transmission line thereby acting to attenuate said disturb signal to a point where it does not exceed said preset level so that the external impedance across said terminals remains constant.

7. In a memory system wherein low level, short duration signals and high level, long duration disturb signals occur sequentially, a sense amplifier adapted to receive, attenuate and recover from said disturb signals in time to sense the polarity of a leading portion of a shortly succeeding data signal, the combination comprising:

input means for providing said signals;

a data signal detector, said detector including first, second, third and fourth negative resistance devices, each said device having an anode and cathode and each exhibiting stable low and high positive resistance regions separated by an unstable negative resistance region, said low positive resistance region exhibiting an extremely low resistance value which remains substantially constant in response to input signal variations falling below a preset level, the cathodes and anodes of said first and third, and second and fourth devices respectively being connected to a common potential, resistive means connecting the anodes of said first and third devices and the cathodes of said second and fourth devices, said resistive means being a substantially equal resistance;

a resistor connecting the anode of said third device to the cathode of said fourth device;

bilevel current means connected to the anodes of said first and third devices and the cathodes of said second and fourth devices for reverse biasing said devices when said disturb signal is expected and for forward biasing said devices to a point in said low resistance region near said negative resistance region when said data signal is expected, the receipt of a leading portion of a data signal causing either the first and third or second and fourth devices to switch to their high resistance region, the switching of said third or fourth devices acting to divert sufficient bias current through said resistor to render the unswitched device insensitive to subsequent portions of said data signal; and a pair of open circuited transmission lines, one terminal of each said line connected to said input means and second terminals of said lines connected to the anode and cathode of said first and second devices respectively, the electrical length of said transmission lines being substantially shorter than said disturb signal, and the external impedance across said terminals being substantially matched to the characteristic impedance of said transmission lines when said devices are reverse-biased, said transmission lines thereby acting to attenuate said disturb signal to a point where it does not exceed said preset level so that the external impedance across said terminals remains constant.

8. A signal attenuator comprising:

an input terminal adapted to receive a signal of known duration;

a load impedance; and a transmission line coupled between said input terminal and said load impedance, said line comprising a pair of capacitively coupled conductors, at a first end of said line, one of said conductors being connected to said input terminal and the other of said conductors being connected to said load impedance, both said conductors being open circuited at a second end of said line, the electrical length of said transmission line being substantially shorter than the duration of said signal.

9. A signal attenuator comprising:

an input terminal adapted to receive signals of long and short duration;

a load impedance; and a transmission line coupled between said input terminal and said load impedance, said line comprising a pair of twisted conductors, at a first end of said line, one of said conductors being connected to said input terminal and the other of said conductors being connected to said load impedance, both said conductors being open circuited at the second end of said line, the electrical length of said transmission line being substantially shorter than the long duration signal, but longer than said short duration signal.

10. The invention as defined in claim 9 wherein said load impedance includes negative resistance means.

References Cited by the Examiner

UNITED STATES PATENTS

| | | | |
|---|---|---|---|
| 3,096,449 | 7/1963 | Stucki ______________ | 307—88.5 |
| 3,187,266 | 6/1965 | Marshall ____________ | 307—88.5 |

OTHER REFERENCES

Sommers, Jr., Tunnel Diode As High-Frequency Devices, July 1959, Proceedings of the IRE, pages 1201–1206.

ARTHUR GAUSS, *Primary Examiner.*

J. BUSCH, *Assistant Examiner.*